United States Patent Office 3,492,218
Patented Jan. 27, 1970

3,492,218
PRODUCTION OF MICRO-CRYSTALLINE WAXES
Alan Collier, Stanwell, Paul Anthony Lawrence, Weybridge, and Robert James Keir Harris, Dorking, England, assignors to The British Petroleum Company Limited, London, England, a corporation of England
No Drawing. Filed Nov. 20, 1967, Ser. No. 684,500
Claims priority, application Great Britain, Dec. 5, 1966, 54,275/66; Aug. 17, 1967, 37,860/67
Int. Cl. C10g 23/00, 25/04, 43/02
U.S. Cl. 208—27                                    11 Claims

ABSTRACT OF THE DISCLOSURE

Microcrystalline wax is made more flexible by selective hydrocatalytic destruction of n-paraffin wax over a catalyst comprised of a hydrogenation component and mordenite. The mordenite is preferably decationized and has a $SiO_2.Al_2O_3$ ratio of at least 14:1 particularly 16–25:1. The process conditions may be 400–800° F., 100–3000 p.s.i.g., 0.2–20 v./v./hr. and 500–20000 s.c.f. of $H_2/B$.

The selective n-paraffin wax destruction may be given at any stage of micro-crystalline wax preparation, but preferably to slack wax. It may be combined with de-oiling (particularly solvent recrystallization) and wax finishing steps.

---

This invention relates to the production of improved microcrystalline waxes and in particular to a catalytic treatment for producing flexible micro-crystalline wax.

Micro-crystalline waxes can be produced by the de-oiling of so-called bright stock slack waxes at a temperature within the range 20°–60° F. Bright stock slack wax is obtained from the residues of the vacuum stage of crude petroleum distillation and contains a large proportion of micro-crystalline wax having good flexibility and good adhesive properties. However, the waxes may contain some n-paraffinic, or non-flexible, wax which impairs the quality and which is difficult or expensive to remove by conventional separation techniques. Catalytic processes to convert the paraffin wax have been found impracticable up to now because most catalysts are not selective and would destroy other waxes, e.g. isoparaffins, as well as the n-paraffinic wax.

U.K. patent specification No. 1,088,933 describes and claims a process of the catalytic conversion of hydrocarbons comprising contacting the hydrocarbons at elevated temperature and pressure and in the presence of hydrogen with a catalyst comprising a crystalline mordenite having pore openings at least 4 A. in diameter, and a hydrogenating component selected from metals, or oxides thereof, of Group VI or VIII of the Periodic Table. The process is stated to be particularly suitable for the selective cracking of waxy hydrocarbons.

The present invention consists of a process for the production of good quality flexible micro-crystalline wax, which is suitable for laminating and coating purposes.

According to the present invention a process for the production of flexible micro-crystalline wax comprises contacting a feedstock containing micro-crystalline wax and n-paraffin wax at elevated temperature and pressure and in the presence of hydrogen with a catalyst comprising a Group VI or VIII hydrogenation component incorporated with a crystalline mordenite of low alkali metal content to selectively convert the n-paraffin wax.

The catalytic treatment over the mordenite catalyst besides removing n-paraffins themselves may also remove waxes having a long straight chain wax as part of their structure, e.g. slightly branched chain waxes and the removal of this paraffinic material may also contribute to the improvement in flexibility obtained.

Micro-crystalline wax is produced from crude oil by the steps of distillation under vacuum to give a vacuum residue, deasphalting the residue, dewaxing to give bright stock slack wax and de-oiling of the slack wax. In addition the wax usually has to have a finishing treatment e.g. treatment with clay, bauxite or acid to improve colour and odour. The catalytic wax removal step may be carried out at any stage in the wax production after the deasphalting step and it may thus be given to the deasphalted residue, to the bright stock slack wax, to the de-oiled wax before finishing or to the finished wax. Preferably however the feedstock of the present invention is bright stock slack wax. By carrying out the catalytic wax removal step before de-oiling, any oil produced during the treatment can be removed along with the oil already in the slack wax. The de-oiling step may also remove soft waxes produced during the catalytic wax removal step, which waxes, like the oil, can have a significant effect on handling and storage characteristics and on the softness of the wax. The term "de-oiling" is thus not to be read as necessarily limited solely to removal of oil. Treating the slack wax also makes the process easier to integrate into a refinery where both crystalline and microcrystalline waxes are being produced from the same plant.

Treatment of the de-oiled wax can also be used, however, particularly if the de-oiling is carried out to a low oil content (less than 1%). The small amount of oil and soft wax produced during the catalytic wax removal step may then be tolerable.

Finishing with bauxite, clay or acid is gradually being replaced by hydrocatalytic finishing and catalytic wax removal from de-oiled wax can be particularly conveniently integrated with a hydrocatalytic finishing step.

The process conditions for the n-paraffin wax removal may vary according to the n-paraffin content and the degree of removal required, more severe conditions being required for higher n-paraffin contents and/or greater removal. The process conditions may also vary depending on whether the deasphalted residue, the slack wax, the unfinished de-oiled wax, or the finished wax is being treated, the most severe conditions being necessary with the residue and slack wax and the least severe conditions with the finished wax. Increase in severity of treating may be achieved in known manner by increasing the temperature and/or decreasing the space velocity. Having regard to the above considerations, the process conditions may be chosen from the following ranges:

|  | Broad Range | Preferred Range | |
|---|---|---|---|
|  |  | Slack Wax | De-oiled Wax |
| Temperature, °F | 400–800 | 600–700 | 450–650 |
| Pressure, p.s.i.g | 100–3,000 | 800–1,500 | 800–1,500 |
| Space velocity, v./v./hr | 0.2–20 | 0.5–5 | 0.5–5 |
| Gas rate s.c.f. of $H_2/B$ | 500–20,000 | 3,000–15,000 | 3,000–15,000 |

The hydrocracked products are largely $C_3$ and $C_4$ hydrocarbons which are readily separated from the unconverted micro-crystalline wax.

The term "mordenite of low alkali metal content" means mordenite having an alkali metal content of less than 2% wt. by weight of the mordenite, more particularly less than .05% wt. The alkali metal cations normally present may be replaced for example by alkaline earth metal cations or magnesium cations, but preferably decationized mordenite is used i.e. a mordenite having a deficiency of metal cations which normally balance the free valencies in the silicon-aluminium-oxygen crystal lattice. Sometimes the term "hydrogen mordenite" is used, it being assumed that the ion balance is maintained by hydrogen ions. However since hydrogen ions cannot be detected or measured in the crystal structure, whereas a deficiency of metal cations can, the former description is preferred.

Decationization can be achieved by replacement of metal cations with ammonium ions, followed by heating to drive off the ammonia. Direct acid treatment, preferably with a strong acid such as hydrochloric or sulphuric acid may also be used.

The normal formula for mordenite is $$1Me_{2/n}O.Al_2O_3 9\text{--}11SiO_2.xH_2O$$

where Me is a metal cation, $n$ is the valency of Me and $x$ is variable. However the $SiO_2:Al_2O_3$ mole ratio can be increased by for example decationization using strong acid and the preferred mordenites used in the present invention have a $SiO_2:Al_2O_3$ mole ratio of at least 14:1, preferably at least 16:1. A convenient upper limit is 25:1.

The preferred hydrogenation component is a platinum group metal, particularly platinum or palladium, which is preferably added by ion exchange after the decationization. When decationization is carried out by direct acid treatment it may still be desirable to precede the platinum group metal exchange by a partial ammonium exchange to facilitate the introduction of the platinum group metal. The amount of the platinum group metal is preferably within the range 0.01 to 10% wt., particularly 0.1 to 5% wt.

The other steps in the production of the finished micro-crystalline wax may follow general known practice. Thus the preferred method of de-oiling is solvent re-crystallization. In this the slack wax is dissolved, by heating if necessary, in a selective solvent for wax and the solution cooled. The wax precipitated is filtered off and washed with solvent if necessary, to remove oil trapped between the wax particles during filtration. As stated earlier, soft wax may also be removed by de-oiling, the amount being determined mainly by the recrystallization temperature. The solvent recrystallization conditions should be co-related with the catalytic wax removal step and may be chosen from the following ranges Recrystallization temperature, °F. _____ 20–80
Solvent/wax ratio during re-crystallization, v./v. __ 5–20
Solvent/wax ratio during washing, v./v. _____ 0–15

The solvents used may be those known to be suitable for the dewaxing of lubricating oils for example alkyl ketones (methyl ethyl or methyl isobutyl ketones) mixed with an aromatic hydrocarbon (benzene or toluene), propane, or chlorinated $C_1$–$C_4$ hydrocarbons.

The catalytic wax removal step may itself effect some improvement in the odour, colour or colour stability of the micro-crystalline wax, but preferably the wax, after catalytic treatment and de-oiling is finished to improve those characteristics further. The finishing treatment may be bauxite finishing or hydrofinishing which may be carried out under the following range of conditions Temperature—480–680° F., preferably 570–660°
Pressure—100–2000 p.s.i.g., preferably 600–1500 p.s.i.g.
Space velocity—0.1–10 v./v./hr., preferably 0.1–4 v./v./hr.
Hydrogen/wax ratio—10–150 v./v., preferably 20–80 v./v.

The hydrofinishing catalyst may be one or more of the Group VIa metals, the Group VIII metals and rhenium on a support, e.g. a refractory inorganic oxide or active carbon.

The invention is illustrated by the following examples.

EXAMPLE 1

A finished micro-crystalline wax was treated over a catalyst of platinum on decationized mordenite having the following analysis:

Platinum, percent weight _____ 0.87
Aluminium, percent weight _____ 3.98
Silicon, percent weight _____ 41.1
$SiO_2:Al_2O_3$, mole ratio _____ 20:1
Sodium, percent weight _____ 0.12
Surface area, m.²/g. _____ 424
Pore volume, ml./g. _____ 0.22

The catalyst was prepared by refluxing sodium mordenite with 20% wt. sulphuric acid for 4 hours to give a decationized mordenite having an increased silica:alumina ratio, contacting the decationized mordenite with ammonium chloride solution to form ammonium mordenite, exchanging part of the ammonium with platinum by contact with a tetrammine platinous chloride solution, and calcining to form the platinum-decationized mordenite.

Three runs were carried out at different temperatures. The process conditions used and inspection data on the feedstock and product are given in Table 1 below:

TABLE 1

| Processing Conditions: | | | | |
|---|---|---|---|---|
| Temperature, °F. | | 500 | 525 | 550 |
| Pressure, p.s.i.g. | | 1,000 | 1,000 | 1,000 |
| Space velocity, vol./vol. h. | | 2.0 | 2.0 | 2.0 |
| Hydrogen gas gate, s.c.f./bbl. | | 10,000 | 10,000 | 10,000 |
| | Feedstock | | | |
| Product Properties: | | | | |
| Yield, percent wt. on feed | 100 | 91 | 87 | 76 |
| ASTM D.1321/65: | | | | |
| Penetration, 25° C. | 25 | 28 | 33 | 40 |
| Penetration, 40° C. | 114 | 142 | 170 | 207 |
| Ball hardness, 60° F. | 26.3 | 18.4 | 11.8 | 9.7 |
| Melting point (ASTM D.127/63), °F. | 162.0 | 162.6 | 161.4 | 157.8 |
| Congealing point (ASTM D.938/60), °F. | 156.5 | 157.5 | 156.0 | 154.0 |
| Colour (ASTM D.1500/58) | L1:0 | L1:0 | L0:5 | 0.5 |
| Refractive Index, $n_D^{80}$ | 1.4490 | 1.4500 | 1.4505 | 1.4510 |
| Oil content (ASTM D.721/65), percent wt. | 1.65 | 2.15 | 2.10 | 2.95 |
| Flexibility, cycles at 70° F. | <100 | 200 | 250 | 900 |

The method of determining the flexibility was to cast a block of wax 3 ins. x 2 ins. x ¾ in., cut strips from the middle of the block each 2 ins. x ¼ in. x ⅛ in. and flex the strips repeatedly until they broke. The strips were held stationary at one end, passed between two guides formed of ⅛ in. diameter steel bars at the mid points of the strips and gripped at the other end by a crank mechanism which flexed the strips through an angle of 75°. The guides ensured that the strips bent at their mid points about the guides. The testing was carried out at room temperature (70° F.) and the greater the number of cycles of flexing before fracture, the greater was the flexibility. What constitutes a satisfactory flexibility depends on the use to which the wax is subsequently put, but a minimum flexibility of 200 cycles was considered necessary and a flexibility of at least 400 cycles preferred.

Table 1 shows the considerable increase in flexibility resulting from the catalytic treatment. This, together with the fact that the product is softer, has a lower melting point and has a higher refractive index, indicates removal of n-paraffinic wax. Removal of n-paraffinic wax was confirmed by examination of the products in a mass spectrometer, and by gas liquid chromatography.

EXAMPLE 2

This example shows the simultaneous catalytic dewaxing and hydrofinishing of a recrystallized but unfinished micro-crystalline wax.

A micro-crystalline wax having a melting point of 160° F. was passed over a bed of 75 ml. of catalyst made up of 25 ml. platinum hydrogen mordenite having the following composition Platinum, percent weight _____ 0.55
Aluminium, percent weight _____ 4.90
Silicon, percent weight _____ 41.55
$SiO_2:Al_2O_3$, mole ratio _____ 16.4:1
Sodium, percent weight _____ 0.11
Surface area, m.²/g. _____ 412
Pore volume, ml./g. _____ 0.21

50 ml. 2.5% wt. nickel oxide (NiO) and 12.5% wt. molybdenum oxide ($MoO_3$) on alumina.

The wax was passed first through the platinum mordenite catalyst and then through the Ni-Mo on alumina catalyst. The process conditions were Pressure _____ p.s.i.g__ 1000
Space velocity (in relation to mordenite) __ v./v./hr__ 2
$H_2$ gas rate _____ s.c.f./B__ 10,000

The two sections of the bed were maintained at different temperatures. These, together with inspection data on the feed and products are given in Table 2 below.

TABLE 2

| | | Catalyst Temperature, °F. | |
|---|---|---|---|
| | Feed | 600 Pt-mordenite 650 NiMo-Al₂O₃ | 625 Pt-mordenite 675 NiMo-Al₂O₃ |
| Penetration: | | | |
| At 25° C | 21 | 33 | 37 |
| At 40° C | 115 | 162 | 196 |
| Ball Hardness: | | | |
| At 60° F | 22.7 | 11.0 | 8.0 |
| At 85° F | <5 | <5 | <5 |
| Melting Point, °F | 170.6 | 170.6 | 166.6 |
| Congealing Point, °F | 163 | 160.0 | 155.0 |
| Colour | (¹) | 2.0 | L 2.0 |
| Refractive Index, $n_d^{80}$ | 1.4500 | 1.4497 | 1.4510 |
| Oil Content, percent wt | 2.1 | 2.55 | 2.85 |
| Flexibility, cycles at 70° F | (70) | 230 | 520 |
| Yield, percent wt. on feed | [100] | 84.0 | 77.5 |

¹ Too dark to measure.

EXAMPLE 3

This example shows the catalytic treatment of slack wax followed by recrystallisation.

The slack wax used as feedstock had an ASTM oil content of 10% wt.

Several catalytic dewaxing runs were carried out on samples of the feedstock at varying temperatures. The following process conditions were kept constant throughout the runs Pressure _____ p.s.i.g__ 1000
Space velocity _____ v./v./hr__ 1
Hydrogen gas rate _____ c.c.f./B__ 10,000
Catalyst _____ (¹)

¹ Platinum hydrogen mordenite as in Example 2.

After the catalytic dewaxing, the slack wax was de-oiled by solvent recrystallisation using methyl ethyl ketone/toluene as solvent.

The catalytic dewaxing temperatures, the solvent recrystallization conditions and inspection data on the feedstock and products are given in Table 3 below.

TABLE 3

| Sample No. | | 1 | 2 | 3 | 4 |
|---|---|---|---|---|---|
| | Brightstock slack Wax Feed | ¹ 600 | ¹ 625 | ¹ 650 |
| Recrystallization conditions: | | | | | |
| Temperature, °F | | 46 | 32 | 46 | 46 |
| MEK/toluene ratio, vol./vol | | 75/25 | 75/25 | 75/25 | 75/25 |
| Solvent/wax ratio, vol./vol | | 10/1 | 10/1 | 10/1 | 10/1 |
| Wash ratio, vol./vol | | 2/1 | 2/1 | 2/1 | 2/1 |
| Product properties: | | | | | |
| Penetration, mm./10: | | | | | |
| At 25° C | | 15 | 24 | 25 | 27.5 |
| At 40° C | | 71 | 154 | 106 | 154 |
| Melting point, °F | | 180.6 | 172.6 | 168.8 | 160.2 |
| Congealing point, °F | | 168 | 158 | 158 | 145.5 |
| Refractive index, $n_d^{80}$ | | 1.4515 | 1.4542 | 1.4547 | 1.4565 |
| Oil content, percent wt | | 0.25 | 0.15 | 0.25 | 0.1 |
| Flexibility, cycles at 70° F | | 0 | 130 | 280 | 1000 |
| Yields on feed: | | | | | |
| Catalytically treated product, percent wt | | [100] | 82.0 | 81.4 | 70.8 |
| Recrystallized wax, percent wt | | | 68.6 | 49.4 | 40.8 |

¹ Catalyst temperature, °F.

The table shows that the feedstock itself, after recrystallization alone, was quite inflexible. Increasing the temperature of the ratalytic dewaxing increases the wax flexibility, the results at 650° F. being as good as or better than the best commercial waxes.

EXAMPLE 4

The slack wax of Example 3 was subjected to catalytic dewaxing under the following conditions:

Temperature _____ °F__ 700
Pressure _____ p.s.i.g__ 1000
Space velocity _____ v./v./hr__ 2.0
Hydrogen gas rate _____ s.c.f./B__ 5000
Catalyst—Platinum hydrogen mordenite of the following composition:
   Platinum _____ percent weight__ 0.58
   Aluminium _____ do____ 4.55
   Silicon _____ do____ 41.3
   $SiO_2$:$Al_2O_3$ _____ mole ratio__ 17:1
   Sodium _____ percent weight__ 0.18
   Surface area _____ m./g__ 414
   Pore volume _____ ml./g__ 0.20

After the catalytic dewaxing, two portions of the slack wax were de-oiled by solvent recrystallization using methyl ethyl ketone/toluene as solvent. Slightly different ketone/toluene ratios were used in the two cases.

The solvent recrystallization conditions and inspection data on the products are given in Table 4 below.

TABLE 4

| Recrystallization conditions: | | |
|---|---|---|
| Temperature, °F | 32 | 32 |
| MEK/toluene ratio, vol./vol | 50/50 | 45/55 |
| Solvent/wax ratio, vol./vol | 10/1 | 10/1 |
| Wash ratio, vol./vol | 1/1 | 1/1 |
| Product properties: | | |
| Penetration, mm./10: | | |
| At 25° C | 30 | 28 |
| At 40° C | 134 | 98 |
| Melting point, °F | 161.8 | 165.0 |
| Congealing point, °F | 156 | 152 |
| Refractive index, $n_d^{80}$ | 1.4550 | 1.4552 |
| Oil content, percent wt | 1.3 | 0.85 |
| Flexibility, cycles at 70° F | 1000 | 430 |
| Yields on feed: | | |
| Catalytically treated product, percent wt | 75.5 | 75.5 |
| Recrystallized wax, percent wt | 42.4 | 39.4 |

We claim:

1. A process for the production of flexible micro-crystalline wax comprising contacting a feedstock containing a large proportion of micro-crystalline wax and some n-paraffin wax at a temperature of 400 to 800° F., a pressure of from 100 to 3000 p.s.i.g., a space velocity of 0.2 to 20 v./v./hr. and in the presence of 500 to 20,000 s.c.f. of hydrogen/B with a catalyst comprising a Group VI or Group VIII hydrogenation component incorporated with a decationised mordenite having an alkali metal content of less than 2% wt. and having a $SiO_2$:$Al_2O_3$ ratio of at least 14:1, the n-paraffin wax being thereby selectively converted, and recovering flexible micro-crystalline wax as a product.

2. A process as claimed in claim 1 wherein the feedstock is a bright stock slack wax and the processing conditions are a temperature of 600–700° F., a pressure of 800–1500 p.s.i.g., a space velocity of 0.5–5 v./v./hr. and a gas rate of 3000–15,000 s.c.f. of hydrogen/B.

3. A process as claimed in claim 1 wherein the feedstock is a de-oiled slack wax and the process conditions are a temperature of 450–650° F., a pressure of 800–1500 p.s.i.g., a space velocity of 0.5–5 v./v./hr. and a gas rate of 3000–15,000 s.c.f. of hydrogen/B.

4. A process as claimed in claim 1 wherein the alkali metal content of the mordenite is less than 0.5% wt.

5. A process as claimed in claim 1 wherein the mordenite has a $SiO_2$:$Al_2O_3$ ratio of 16:1 to 25:1.

6. A process as claimed in claim 1 wherein the hydrogenation component of the catalyst is from 0.01 to 10% wt. of a platinum group metal.

7. A process as claimed in claim 6 wherein the hydrogenation component of the catalyst is from 0.1 to 5% wt. of platinum or palladium.

8. A process as claimed in claim 1 wherein the catalytic treatment is combined with a solvent recrystallisation treatment to de-oil the wax operated under the following conditions Recrystallisation temperature _____ °F__ 20–80
Solvent/wax ratio during recrystallisation __v./v__ 5–20
Solvent/wax ratio during washing _____v./v__ 0–15

9. A process as claimed in claim 8 wherein the recrystallisation solvent is a mixture of an alkyl ketone and an aromatic hydrocarbon.

10. A process for the production of flexible microcrystalline wax comprising contacting a bright stock slack wax feedstock at a temperature of 600–700° F., a pressure of 800–1500 p.s.i.g., a space velocity of 0.5–5 v./v./hr. and a gas rate of 3000–15,000 s.c.f. of hydrogen/B, with a catalyst comprising a Group VI or Group VIII hydrogenation component incorporated with a decationized mordenite having an alkali metal content of less than 0.5% wt. and a $SiO_2:Al_2O_3$ mole ratio of at least 14:1, the n-paraffin wax in the slack wax being thereby selectively converted.

11. A process as claimed in claim 10 wherein the feedstock is a de-oiled bright stock slack wax and the temperature is 450–650° F.

References Cited

UNITED STATES PATENTS

| | | | |
|---|---|---|---|
| 3,119,762 | 1/1964 | Siegmund | 208—27 |
| 3,190,939 | 6/1965 | Benesi | 260—683.65 |
| 3,268,439 | 8/1966 | Tupman et al. | 208—18 |
| 3,275,545 | 9/1966 | McCall | 208—27 |
| 3,299,153 | 1/1967 | Adams et al. | 260—666 |
| 3,365,390 | 1/1968 | Egan et al. | 208—18 |
| 3,395,096 | 7/1968 | Gladrow et al. | 208—111 |
| 3,214,365 | 10/1965 | Zoeller. | |

HERBERT LEVINE, Primary Examiner

U.S. Cl. X.R.

208—31, 111

PO-1050
(5/69)

UNITED STATES PATENT OFFICE
CERTIFICATE OF CORRECTION

Patent No. 3,492,218      Dated January 27, 1970

Inventor(s) Alan Collier, Paul Anthony Lawrence and Robert James K(

It is certified that error appears in the above-identified patent and that said Letters Patent are hereby corrected as shown below:

Col. 2, line 61 for ".05%" read --0.5%--;
Col. 5, Table 2 (third column from left), line 5 for "170.6" read --167.7--;
Col. 5, line 41 for "c.c.f./B" read --SCF/B--;
Col. 5, Table 2, (left hand column, line 10) for "$n_d 80$" read --$n_D 80$--;
Col. 5, Table 3 (left hand column, line 12) for "$n_d 80$" read --$n_D 80$--;
Col. 5, line 73 for "ratalytic" read --catalytic--;
Col. 6, line 16 for "m./g" read --$m^2/g$--; and
Col. 6, line 29 for "ratlo" read --ratio--.

SIGNED AND
SEALED
SEP 22 1970

(SEAL)
Attest:

Edward M. Fletcher, Jr.
Attesting Officer

WILLIAM E. SCHUYLER, JR.
Commissioner of Patents